United States Patent
Dernar et al.

(10) Patent No.: US 9,328,891 B1
(45) Date of Patent: May 3, 2016

(54) VEHICLE LAMP UNIT

(71) Applicant: Nissan North America, Inc., Franklin, TN (US)

(72) Inventors: Karen Dernar, Novi, MI (US); Kyle Happy, Walled Lake, MI (US); Christopher Prisby, Farmington Hills, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 0 days.

(21) Appl. No.: 14/612,565

(22) Filed: Feb. 3, 2015

(51) Int. Cl.
*B60Q 1/18* (2006.01)
*F21S 8/10* (2006.01)
*B60Q 1/26* (2006.01)
*B60Q 1/30* (2006.01)

(52) U.S. Cl.
CPC ............ *F21S 48/2206* (2013.01); *B60Q 1/2623* (2013.01); *B60Q 1/2661* (2013.01); *B60Q 1/30* (2013.01); *F21S 48/212* (2013.01); *F21S 48/215* (2013.01); *F21S 48/2237* (2013.01); *F21S 48/2281* (2013.01); *F21S 48/25* (2013.01)

(58) Field of Classification Search
CPC ....... F21S 48/212; F21S 48/23; F21S 48/236; F21S 48/215; F21S 48/211; F21S 48/2281; F21S 48/2293; F21S 48/25; B60Q 1/30; B60Q 1/50; B60Q 2500/10; B60Q 2400/40; F21V 7/00; F21Y 2101/02

USPC .......... 362/102, 103, 249.01, 249.02, 249.06, 362/249.08, 507, 511, 540, 543, 551, 554, 362/555, 558, 565, 605, 608, 610, 612, 613
See application file for complete search history.

(56) References Cited

U.S. PATENT DOCUMENTS

| | | | |
|---|---|---|---|
| 7,086,765 B2 | 8/2006 | Wehner | |
| 8,057,081 B2 | 11/2011 | Schwab | |
| 8,075,173 B2 * | 12/2011 | Shallcross | B60Q 3/004 296/146.7 |
| 8,752,986 B2 | 6/2014 | Wuerthele et al. | |
| 9,134,474 B2 * | 9/2015 | Lindsay | F21S 48/1208 |
| 2011/0228549 A1 | 9/2011 | Lindsay et al. | |
| 2012/0051077 A1 | 3/2012 | Arai | |
| 2012/0069592 A1 | 3/2012 | Natsume et al. | |

* cited by examiner

*Primary Examiner* — Hargobind S Sawhney
(74) *Attorney, Agent, or Firm* — Global IP Counselors, LLP

(57) ABSTRACT

A vehicle lamp unit includes a lamp housing configured to be mounted to a vehicle, a bezel member, a light pipe structure and a fastener. The bezel member has a front side facing away from the lamp housing, a back side facing the lamp housing, and a cover trim portion extending from the front side. The light pipe structure has at least one pipe portion disposed on the front side of the bezel member and a mounting flange disposed underneath the cover trim portion. The fastener extends through a first opening of the mounting flange of the light pipe structure and a second opening of the bezel member.

20 Claims, 11 Drawing Sheets

VEHICLE LAMP UNIT

BACKGROUND

1. Field of the Invention

The present invention generally relates to a vehicle lamp unit. More specifically, the present invention relates to a vehicle lamp unit having a bezel member and a light pipe structure attached to the bezel member.

2. Background Information

Most vehicles typically include various lamp assemblies for illuminating exterior areas about the vehicle. For example, most vehicles have a pair of vehicle headlamp assemblies in the front of the vehicle and a pair of vehicle tail light assemblies in the rear of the vehicle. Vehicle lamp assemblies typically function as parking lamps, daytime running lamps, fog lights, off-road utility lights as well as various other signaling devices. In addition to providing light, tail light assemblies can also be decorative with respect to the vehicle. Many modern automotive vehicle lamp assemblies have begun using light emitting diodes (LEDs) as a form of light source. Automakers often combine two separate light sources for lamp units, such as using a light pipe and a reflector structure to provide an aesthetically pleasing illuminated appearance along the edges of a lamp assembly. In the case of vehicle tail light assemblies, it has also been increasingly popular to mount the vehicle tail light assemblies onto a movable panel of a vehicle, such as a trunk lid or a rear door.

SUMMARY

Generally, the present disclosure is directed to a vehicle lamp unit. In the illustrated embodiment, the vehicle lamp unit is part of an overall vehicle lamp assembly that is particularly useful for being mounted on a movable panel, such as a trunk lid or a door.

In view of the state of the known technology, one aspect of the present disclosure provides a vehicle lamp unit comprising a lamp housing, a bezel member, a light pipe structure and a fastener. The lamp housing is configured to be mounted to a vehicle. The bezel member has a front side facing away from the lamp housing, a back side facing the lamp housing, and a cover trim portion extending from the front side. The light pipe structure has at least one pipe portion disposed on the front side of the bezel member and a mounting flange disposed underneath the cover trim portion. The fastener extends through a first opening of the bezel member and a second opening of the mounting flange of the light pipe structure.

In view of the state of the known technology, another aspect of the disclosure provides a lamp housing, a bezel member, a light pipe structure and a fastener. The lamp housing is configured to be mounted to a vehicle. The bezel member has a front side facing away from the lamp housing, a back side facing the lamp housing and a cover trim portion extending from the front side. The light pipe structure has a first pipe portion, a second pipe portion and a mounting flange located at a corner area defined by the intersection of the first and second pipe portions. The bezel member is attached to the first pipe portion at a first end of the light pipe structure and attached to the second pipe portion at a second end of the light pipe structure. The light pipe structure has a mounting flange fixedly securing the light pipe structure to the bezel member at the corner area. The fastener is disposed through a first opening of the bezel member and a second opening of the mounting flange of the light pipe structure.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
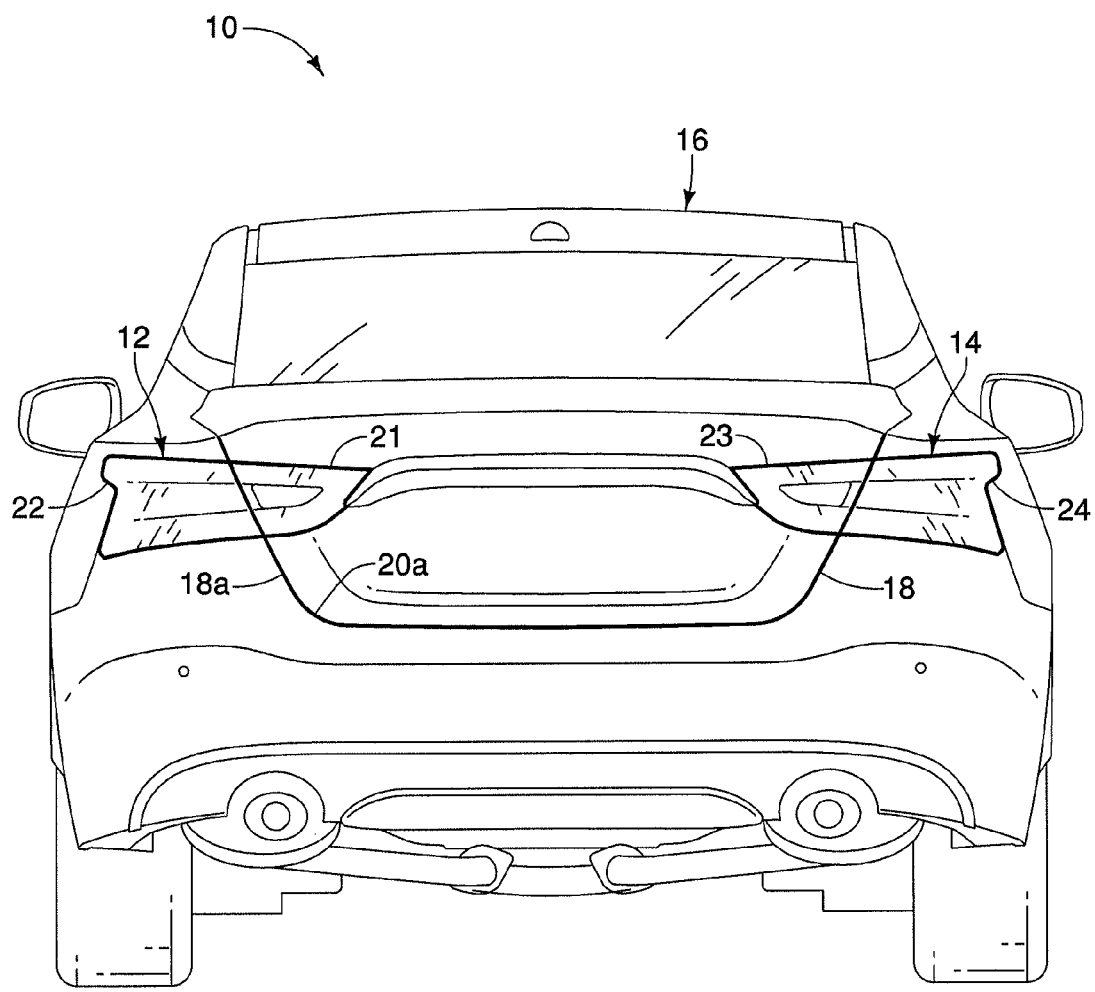
FIG. 1 is a rear elevational view of a vehicle with a vehicle lamp (tail light) assembly that includes a pair of vehicle lamp units in accordance with a first illustrated embodiment.
Figure 2:
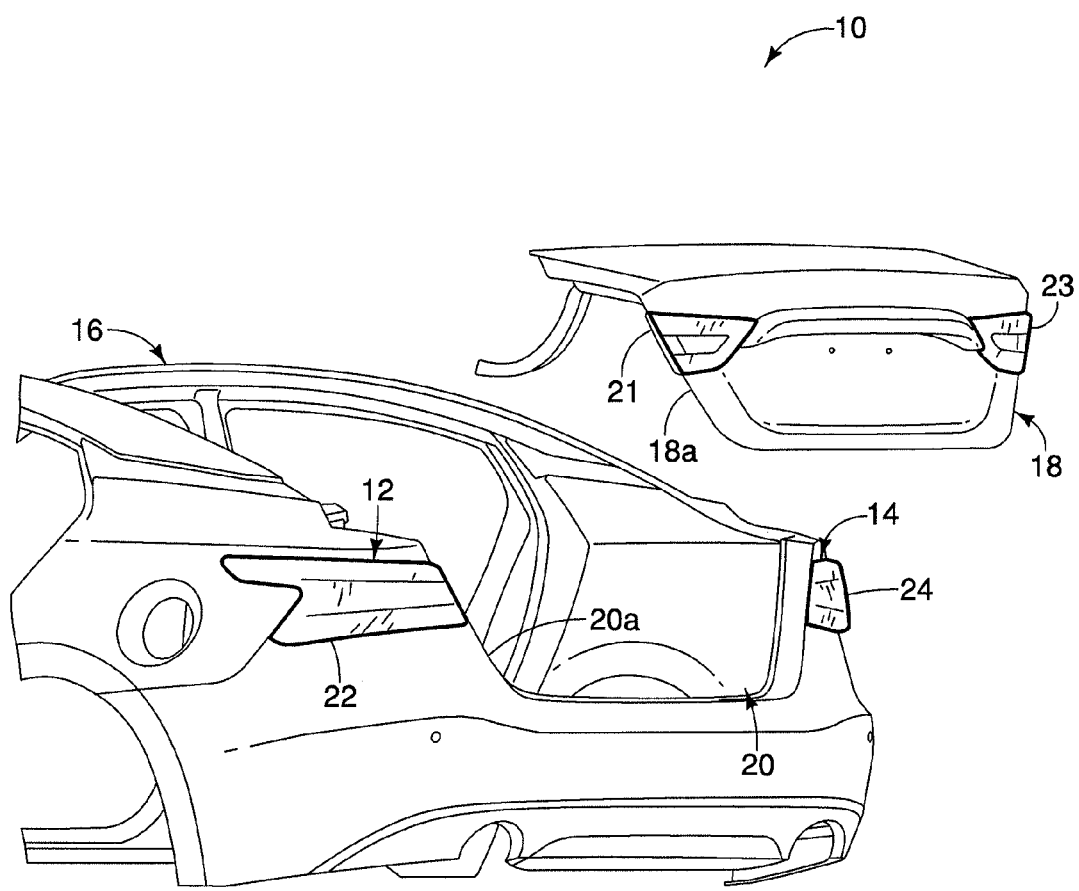
FIG. 2 is an exploded perspective view of a rear portion of the vehicle illustrated in FIG. 1, showing the vehicle lamp units mounted on a movable panel (i.e., a trunk lid)

Referring initially to FIGS. 1 and 2, a vehicle 10 is illustrated that has a pair of rear tail light (combination light) assemblies 12 and 14 in accordance with a first embodiment. The vehicle 10 has a vehicle body 16 with the vehicle tail light assemblies 12 and 14 provided at opposite rear corners of the vehicle body 16. The vehicle body 16 is a relative conventional structure that is configured to accommodate the rear tail light assemblies 12 and 14. While the vehicle 10 is illustrated as a sedan, it will be apparent to those skilled in the automotive field from this disclosure that the rear tail light assemblies 12 and 14 can be configured to be used with other vehicle body styles. In the illustrated embodiment of the vehicle 10, the vehicle body 16 is made of one or more body panels to form a unibody construction. Alternatively, the vehicle body 16 can be a body that is mounted on a frame.

In any case in the illustrated embodiment, as seen in FIG. 2, the vehicle body 16 has at least one stationary body panel that at least partially defines an access opening 20, which is a trunk access opening. A movable body panel 18 is movably mounted on the vehicle body 16 between a closed position (FIG. 1) and an open position. The stationary body panel(s) of the vehicle body 16 and the movable body panel 18 form a vehicle body structure that includes the rear tail light assemblies 12 and 14. Here, in the illustrated embodiment, the movable body panel 18 is a trunk lid that is hinged to the vehicle body 16 to selectively close and open the access opening 20. In the illustrated embodiment, the movable panel 18 has a peripheral edge 18a that aligns with a peripheral edge 20a of the access opening 20 for the vehicle 10. The tail light assemblies 12 and 14 are partially mounted on the vehicle body 16 and partially mounted on the movable body panel 18.

Specifically, the tail light assembly 12 includes a first vehicle lamp unit 21 and a second (mating) vehicle lamp unit 22. Similarly, the tail light assembly 14 includes a first vehicle lamp unit 23 and a second (mating) vehicle lamp unit 24. The vehicle lamp units 21 to 24 are configured to be mounted to the vehicle 10. The first vehicle lamp units 21 and 23 are mounted on the movable vehicle body panel 18, while the second lamp units 22 and 24 are mounted on the vehicle body 16. On most vehicles, the movable vehicle body panel 18 (e.g., a trunk lid or a rear door) has a very shallow depth for accommodating the first vehicle lamp units 21 and 23. Since the available space on the movable vehicle body panel 18 (e.g., a trunk lid or a rear door) is quite limited, the first vehicle lamp units 21 and 23 have been configured, as discussed below, to fit into the limited space of the movable vehicle body panel 18.

Each of the second (mating) lamp units 22 and 24 has a peripheral edge that aligns with a peripheral edge of the first vehicle lamp units 21 and 23 when the movable body panel 18 closes over the access opening 20. The vehicle tail light assemblies 12 and 14 generally include turn signal lights, stop lights, backup (reversing) lights, parking lights and position lights. The tail light assemblies 12 and 14 are identical, except that they are mirror images of each other. For the sake of brevity, only the vehicle tail light assembly 12 will be discussed and illustrated in further detail herein.

Figure 3:
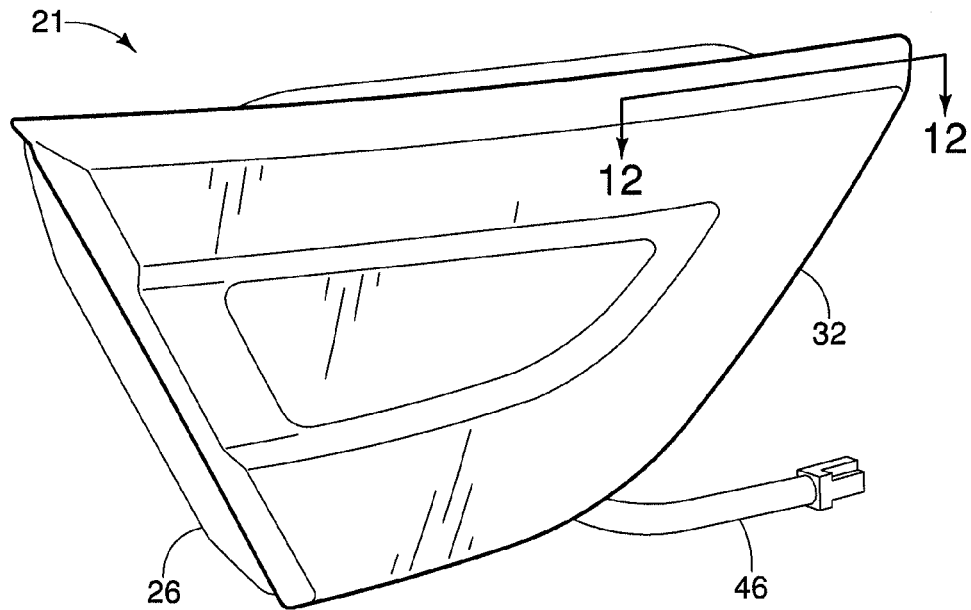
FIG. 3 is an exterior perspective view of the driver side vehicle lamp unit illustrated in FIGS. 1 and 2 in the fully assembled state.
Figure 4:
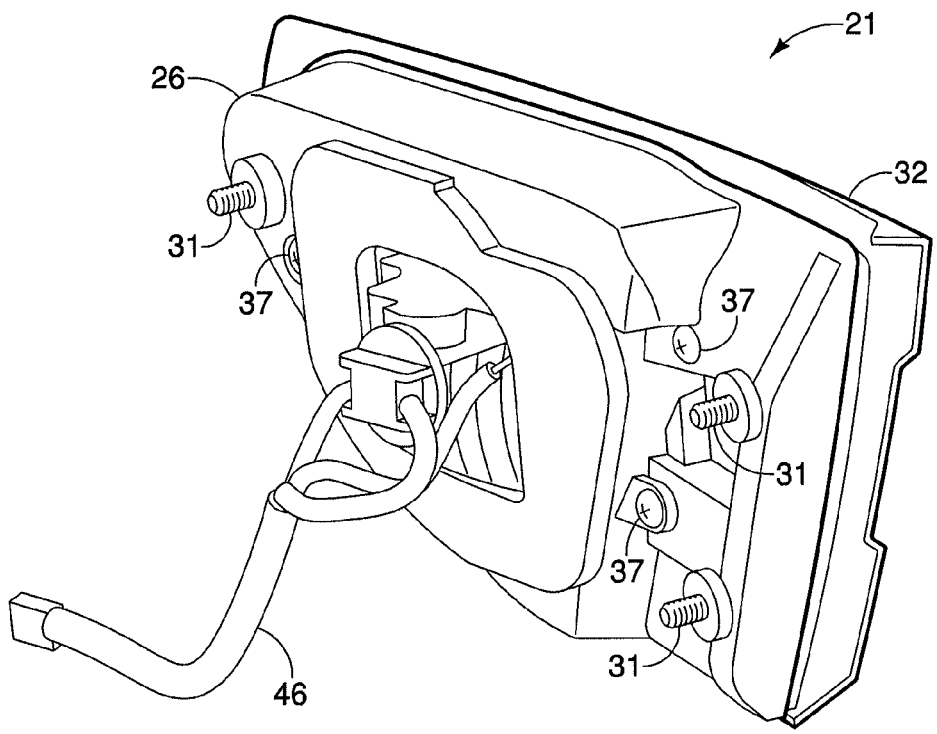
FIG. 4 is a mounting (vehicle facing) side perspective view of the driver side vehicle lamp unit illustrated in FIGS. 1 to 3 in the fully assembled state.
Figure 5:
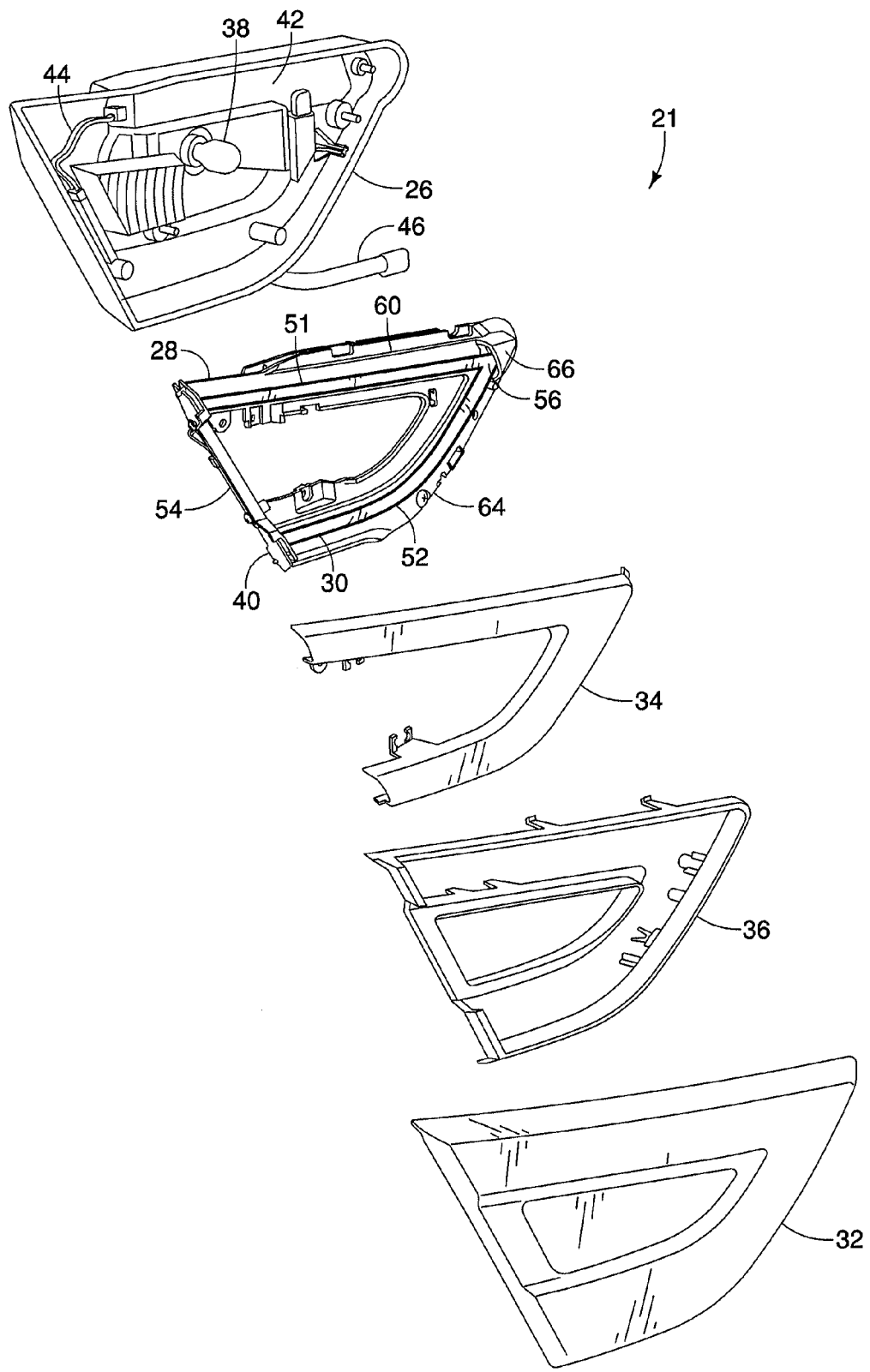
FIG. 5 is an exploded perspective view of the driver side vehicle lamp unit illustrated in FIGS. 1 to 4.

Referring now to FIGS. 3 to 5, the vehicle lamp unit 21 basically comprises a lamp housing 26, a bezel member 28 and a light pipe structure 30. In the illustrated embodiment, the vehicle lamp unit 21 preferably further comprises a transparent outer lens cover 32, a transparent inner lens cover 34 and an inner frame member 36. Basically, the configurations of the transparent outer lens cover 32, the transparent inner lens cover 34 and the inner frame member 36 will depend on the configurations of the lamp housing 26, the bezel member 28 and the light pipe structure 30. In other words, the transparent outer lens cover 32, the transparent inner lens cover 34 and the inner frame member 36 are configured to complement the configurations of the lamp housing 26, the bezel member 28 and the light pipe structure 30.

The lamp housing 26 is typically a molded member formed from a suitable rigid plastic material that is used for conventional lamp housings. As seen in FIG. 4, the lamp housing 26 is fastened to the vehicle body 16 with a plurality of fastening members 31 (i.e., screws in the illustrated embodiment) in a conventional manner. The transparent outer lens cover 32 is fastened (e.g., snap-fitted) to the lamp housing 26 to form a headlamp enclosure that defines an internal lamp space. The transparent outer lens cover 32 has an overall shape that generally corresponds to the overall shape of the lamp housing 26. The bezel member 28, the light pipe structure 30, the transparent inner lens cover 34 and the inner frame member 36 are all disposed inside the internal lamp space that is defined by the transparent outer lens cover 32 and is fastened to the lamp housing 26. Specifically, the bezel member 28 and the inner frame member 36 are fixedly mounted to the lamp housing 26 by a plurality of fasteners 37 (only three shown in FIG. 4), while the light pipe structure 30 is fixedly mounted on the bezel member 28 as discussed below. The transparent inner lens cover 34 is mounted to the bezel member 28 to overlie the light emitting portions of the light pipe structure 30. The transparent inner lens cover 34 diffuses the light that is emitted from the light emitting portions of the light pipe structure 30. The inner frame member 36 is also preferably attached to the bezel member 28 by a snap-fit arrangement. The inner frame member 36 aids in fastening and positioning the transparent inner lens cover 34 with respect to the bezel member 28. The precise construction of the lamp housing 26, the inner lens cover 34, the inner frame member 36 and the outer lens cover 32 can vary in shape and construction depending on the styling of the vehicle, and thus, will not be discussed in further detail herein.

As seen in FIG. 5, the vehicle lamp unit 21 further comprises a backup light 38 that is mounted to the lamp housing 26. The backup light 38 emits light that shines through the transparent outer lens cover 32. In other words, the backup light 38 is positioned to illuminate a central portion of the transparent outer lens cover 32 inside the transparent inner lens cover 34. Thus, the light emitted from the backup light 38 does not pass through the light pipe structure 30 and the transparent inner lens cover 34.

Figure 6:
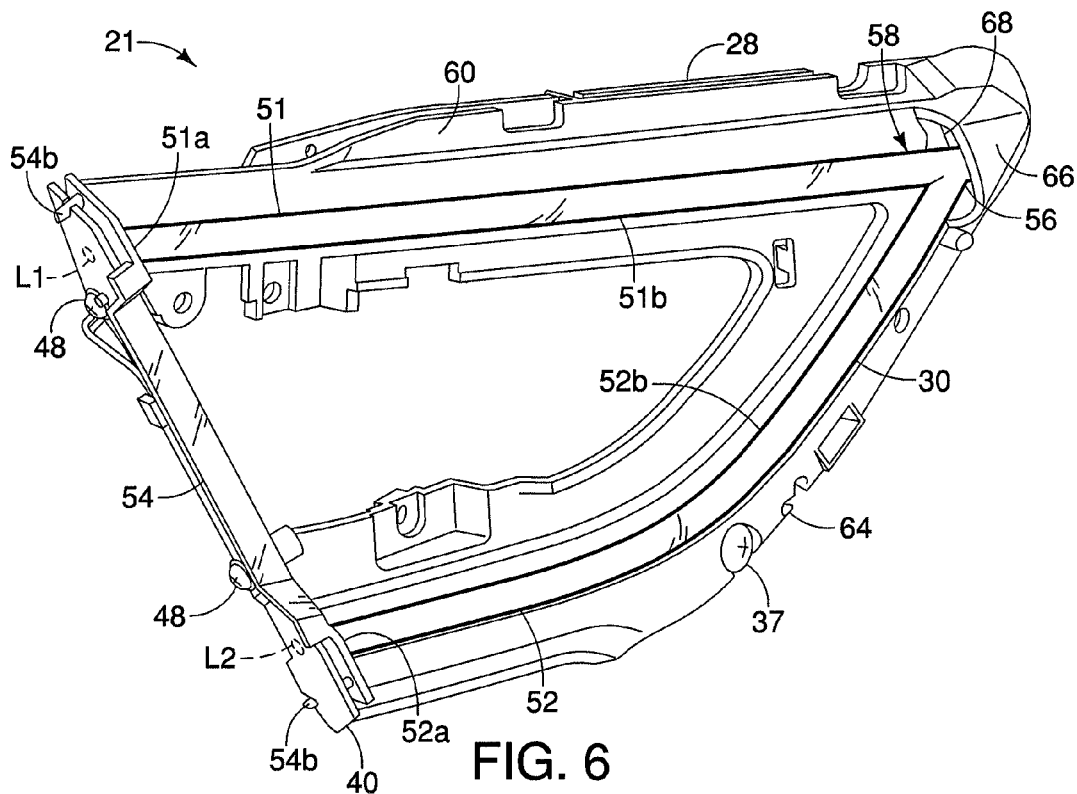
FIG. 6 is an exterior facing side perspective view of selected parts of the driver side vehicle lamp unit illustrated in FIGS. 1 to 5, with the lamp housing and cover portions removed.
Figure 7:
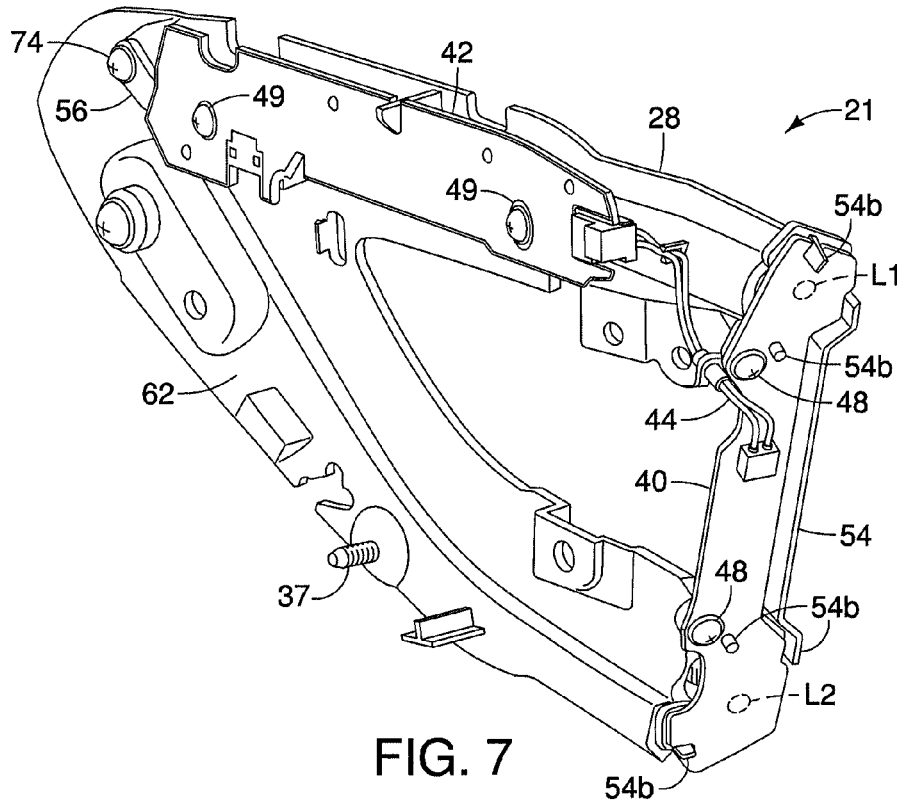
FIG. 7 is a vehicle facing side perspective view of selected parts of the driver side vehicle lamp unit with the lamp housing and cover portions removed.

As seen in FIGS. 6 and 7, the vehicle lamp unit 21 further comprises first and second circuit boards 40 and 42 that control the operation and functions of the light sources that illuminate the vehicle lamp unit 21. The first circuit board 40 is electrically connected to the second circuit board 42 by a first wiring harness 44. As seen in FIG. 4, a second wiring harness 46 is electrically connected to the backup light 38 and the first and second circuit boards 40 and 42 for supplying electrical power thereto. The first circuit board 40 is mounted to the bezel member 28 by a pair of fasteners 48. The light pipe structure 30 is sandwiched between the bezel member 28 and the first circuit board 40 such that the light pipe structure 30 is secured at a first end section to the bezel member 28 and the first circuit board 40 by the fasteners 48. The second circuit board 42 is secured to the back side of the bezel member 28 by a pair of fasteners 49 (i.e., a pair of screws).

The first circuit board 40 has at least one light source emitting light to be received by the light pipe structure 30. In the illustrated embodiment, the first circuit board 40 has a first light source L1 and a second light source L2. Preferably, the first and second light sources L1 and L2 are light emitting diodes (LEDs). However, other suitable light sources can be used as needed and/or desired. The first circuit board 40 is a printed circuit board having a substrate with a printed circuit that interconnects the first and second light sources L1 and L2. The second circuit board 42 is a printed circuit board having an LED driver module for powering and operating the LEDs on the first circuit board 40. The light pipe structure 30 is supported and arranged with respect to the first circuit board 40 such that the light pipe structure 30 receives light emitted by the first and second light sources L1 and L2. In this way, the light pipe structure 30 is illuminated by the first and second light sources L1 and L2.

Figure 8:
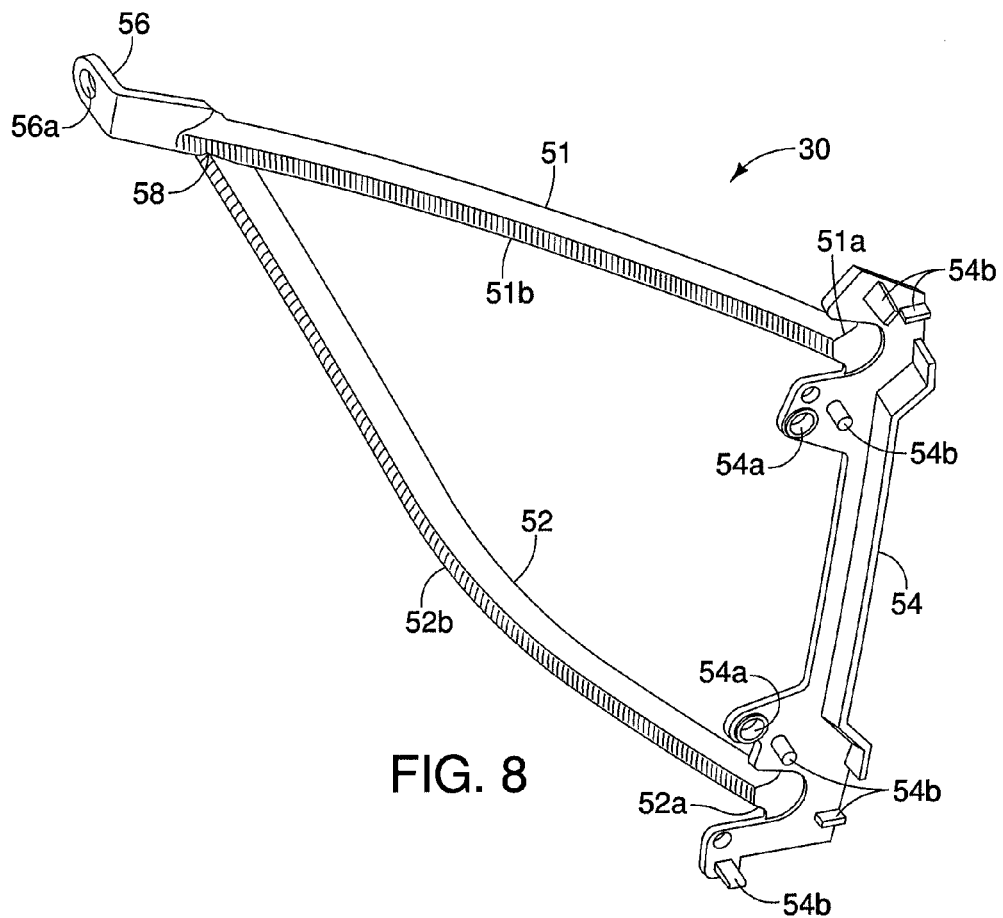
FIG. 8 is a vehicle facing side perspective view of the light pipe structure of the driver side vehicle lamp unit.

Referring now to FIGS. 6 to 8, the light pipe structure 30 will now be discussed in more detail. The light pipe structure 30 is formed from a material that can transmit and diffuse light in preselected amounts across the length of the light pipe structure 30. The light pipe structure 30 of the illustrated embodiment has a first pipe portion 51, a second pipe portion 52, a first mounting part 54 and a second mounting part 56. Here, the first pipe portion 51, the second pipe portion 52, the first mounting part 54 and the second mounting part 56 are formed as a one-piece member of a single material such as plastic. The light pipe structure 30 is mounted to the bezel member 28 such that the first and second pipe portions 51 and 52 are disposed on a front (exterior) side of the bezel member 28, while the second mounting part 56 is disposed at least partially on a back (vehicle facing) side. The second mounting part 56 interconnects the first and second pipe portions 51 and 52, and is hidden behind the inner frame member 36. In this way, the first and second mounting parts 54 and 56 are substantially hidden from view through the transparent outer lens cover 32 and the transparent inner lens cover 34. However, the light pipe structure 30 is not limited to this configuration. For example, the light pipe structure 30 can have only one pipe portion, if needed and/or desired for a particular vehicle styling. In other words, the light pipe structure 30 has at least one pipe portion disposed on the front side of the bezel member 28. Preferably, the at least one pipe portion is supported at opposite ends by first and second mounting parts 54 and 56 are substantially hidden from view through the transparent outer lens cover 32 and the transparent inner lens cover 34.

As seen in the illustrated embodiment, the light pipe structure 30 has a shape that generally corresponds to the overall shape of the lamp housing 26 and the overall shape of the vehicle lamp unit 21. The first pipe portion 51 has a first end 51a that receives light from the first light source L1 of the first circuit board 40. The second pipe portion 52 has a second end 52a that receives light from the second light source L2 of the first circuit board 40. The light pipe structure 30 further has a corner area 58 that is defined by an intersection of the first and second pipe portions 51 and 52. The first pipe portion 51 includes a faceted surface 51b that disperses light received from the first light source L1. The second pipe portion 52 includes a faceted surface 52b that disperses light received from the second light source L2. Thus, the first light source L1 emits light into the first end 51a of the first pipe portion 51 to illuminate the first pipe portion 51 of the light pipe structure 30. The second light source L2 emits light into the second end 52a of the second pipe portion 52 to illuminate the second pipe portion 52 of the light pipe structure 30.

As seen in FIG. 8, the first mounting part 54 interconnects the first end 51a of the first pipe portion 51 and the second end 52a of the second pipe portion 52. Here, the first mounting part 54 has two mounting openings 54a that receive the fasteners 48 therethrough to secure the light pipe structure 30 in between the bezel member 28 and the first circuit board 40. Preferably, the first mounting part 54 has a plurality of projections 54b that are received in corresponding openings (unnumbered) of the first circuit board 40 as seen in FIGS. 7 and 8.

As seen in FIG. 8, the second mounting part 56 is an L-shaped flange that extends from the corner area 58 of the light pipe structure 30. In the illustrated embodiment, the second mounting part 56 is integrally formed as a one-piece member with the first and second pipe portions 51 and 52. Thus, the second mounting part 56 is also made of a material that can transmit and diffuse light. The second mounting part 56 has a first opening 56a. The second mounting part 56 and the first opening 56a will be discussed in further detail below.

Figure 9:
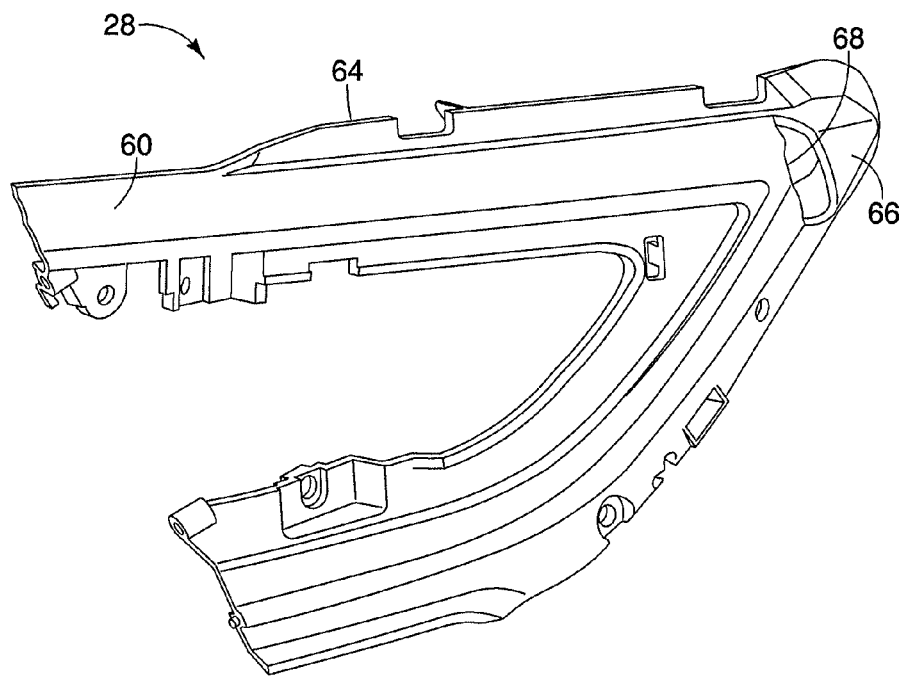
FIG. 9 is an exterior facing side perspective view of the bezel member of the driver side vehicle lamp unit.

Referring now to FIGS. 6 to 9, the bezel member 28 will now be discussed in further detail. The bezel member 28 is a trim member that generally outlines the peripheral edges of the first and second pipe portions 51 and 52 of the light pipe structure 30. Specifically, the bezel member 28 is generally V-shaped with a first bezel portion that is behind the first pipe portion 51 and a second bezel portion that is behind the second pipe portion 52. In this way, the bezel member 28 serves to provide a finished look behind the first and second pipe portions 51 and 52 of the light pipe structure 30. The bezel member 28 has a front (exterior) side 60 that faces away from the lamp housing 26 and a back (vehicle facing) side 62 facing the lamp housing 26. Basically, the bezel member 28 has a main body 64 and a cover trim portion 66. The cover trim portion 66 is a raised portion that projects outwardly from the front (exterior) side 60 of the main body 64. As best seen in FIG. 9, a light pipe receiving opening 68 is formed between the main body 64 and the cover trim portion 66 for receiving the second mounting part 56 of the light pipe structure 30 at the corner area 58 of the light pipe structure 30.

Figure 10:
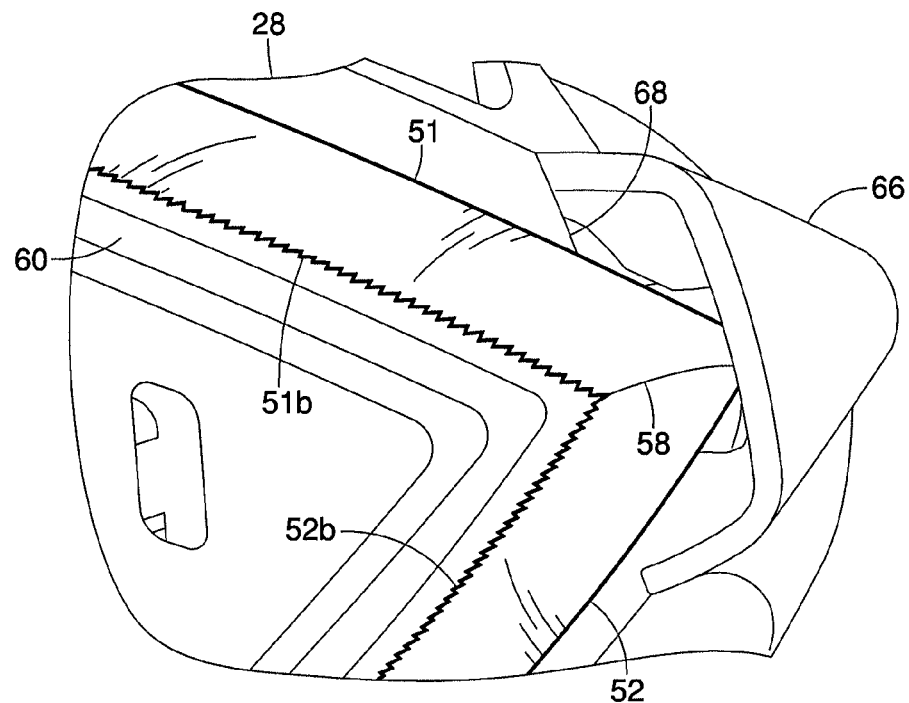
FIG. 10 is an enlarged, partial exterior facing side perspective view of a portion of the driver side vehicle lamp unit, showing the attachment of the light pipe structure to the bezel member at a corner area of the vehicle lamp unit.

According to the first embodiment, as seen in FIG. 10, the cover trim portion 66 overlies the corner area 58 of the light pipe structure 30. Specifically, the cover trim portion 66 extends over the second mounting part 56 of the light pipe structure 30 such that when the second mounting part 56 is disposed in the light pipe receiving opening 68 of the bezel member 28, the second mounting part 56 is hidden from view. Thus, the second mounting part 56 is disposed underneath the cover trim portion 66.

Figure 11:
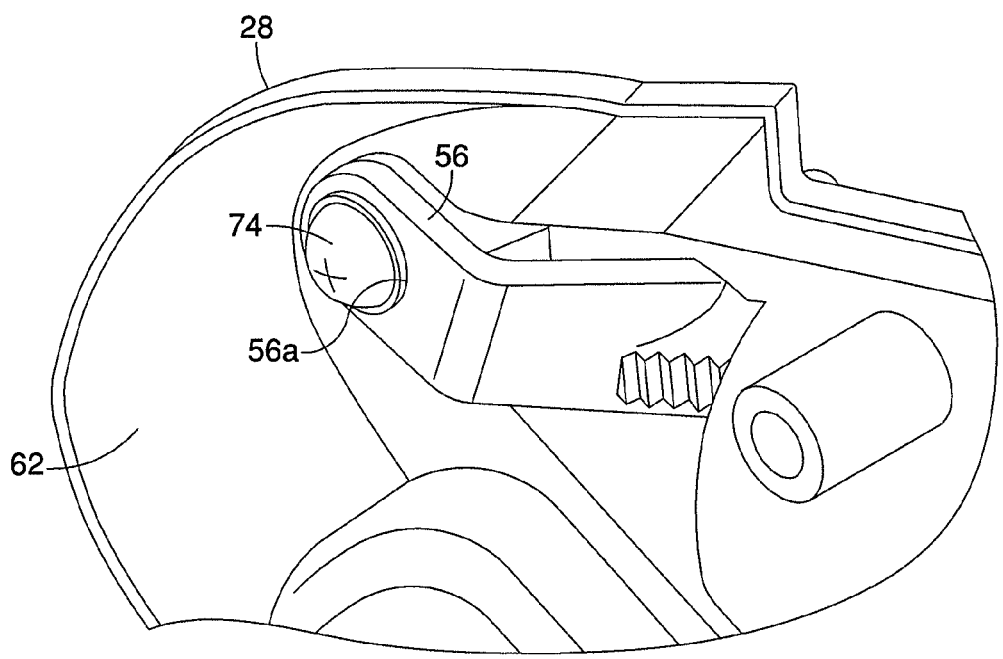
FIG. 11 is an enlarged, partial vehicle facing side perspective view of a portion of the driver side vehicle lamp unit, showing the attachment of the light pipe structure to the bezel member at a corner area of the vehicle lamp unit.
Figure 12:
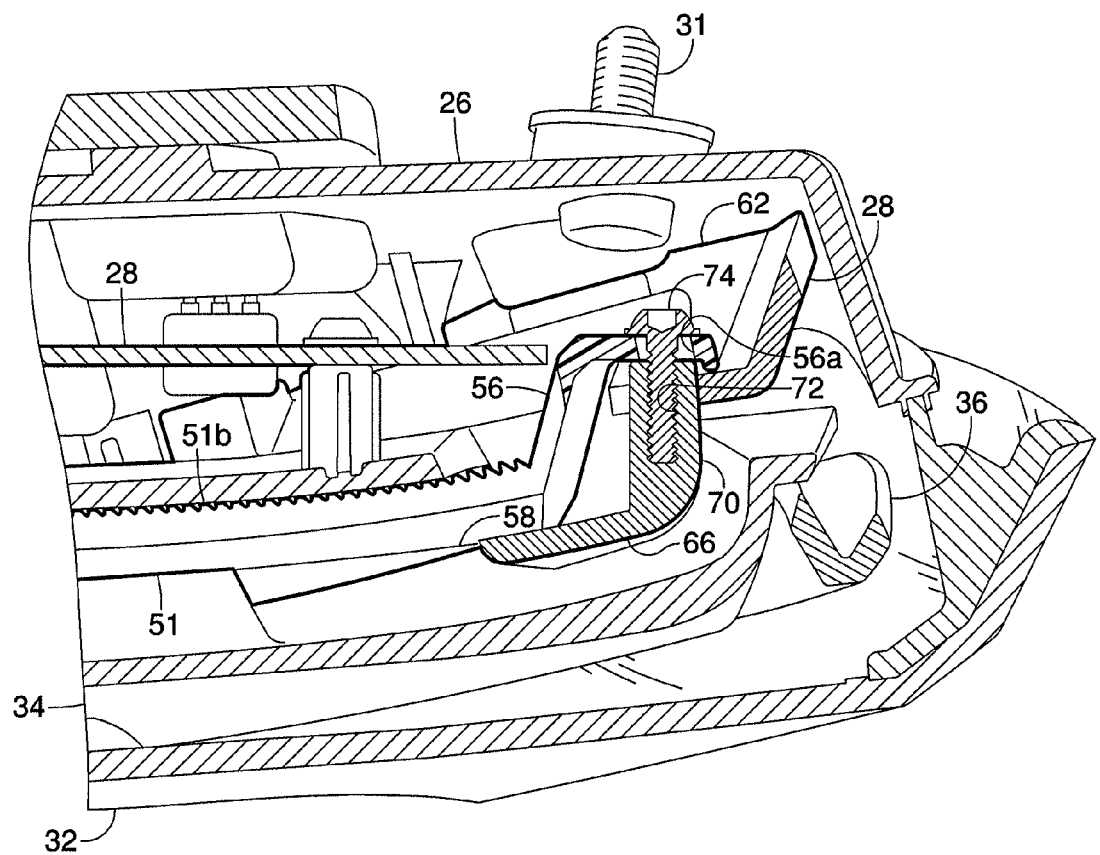
FIG. 12 is a partial cross sectional view of a portion of the driver side vehicle lamp unit, taken along a section line 12-12 in FIG. 3.

Referring now to FIGS. 11 and 12, the cover trim portion 66 of the bezel member 28 includes a mounting boss 70 extending from the backside of the bezel member 28 toward the lamp housing 26. The mounting boss 70 has a second opening 72 for receiving a fastener 74. The fastener 74 extends through the first opening 56a of the second mounting part 56 of the light pipe structure 30 as well as the second opening 72 of the mounting boss 70 of the bezel member 28. Thus, the first opening 56a of the second mounting part 56 and the second opening 72 of the bezel member 28 are aligned when the vehicle lamp unit 21 is assembled. In the illustrated embodiment, the fastener 74 is a screw that is screwed into the second opening 72 of the mounting boss 70 to secure the light pipe structure 30 to the bezel member 28 at the corner area 52 of the light pipe structure 30. Thus, in the illustrated embodiment, the second opening 72 of the bezel member 28 is threaded to receive the fastener 74. Alternatively, the fastener 74 can be any securing member that fixedly fastens the light pipe structure 30 to the bezel member 28. In any case, when the vehicle lamp unit 21 is assembled, the mounting boss 70 is located on a hidden surface of the cover trim portion 66 of the bezel member 28 so that the fastener 74 is completely hidden as viewed from the front side 60 of the bezel member 28.

With the arrangement of the light pipe structure 30 and the bezel member 28, the vehicle lamp unit 21 is provided with a continuous illuminated appearance at the corner area 58 at the intersection of the first and second light pipe portions 51 and 52. That is, because the fastener 74 fixedly secures the light pipe structure 30 to the bezel member 28 at the corner area 58 and is disposed underneath a hidden surface of the bezel member 28 (the cover trim portion 66), the vehicle lamp unit 21 has a continuous lit appearance at the corner area 58 that is uninterrupted by the fastening of the light pipe structure 30 to the bezel member 28.

Figure 13:
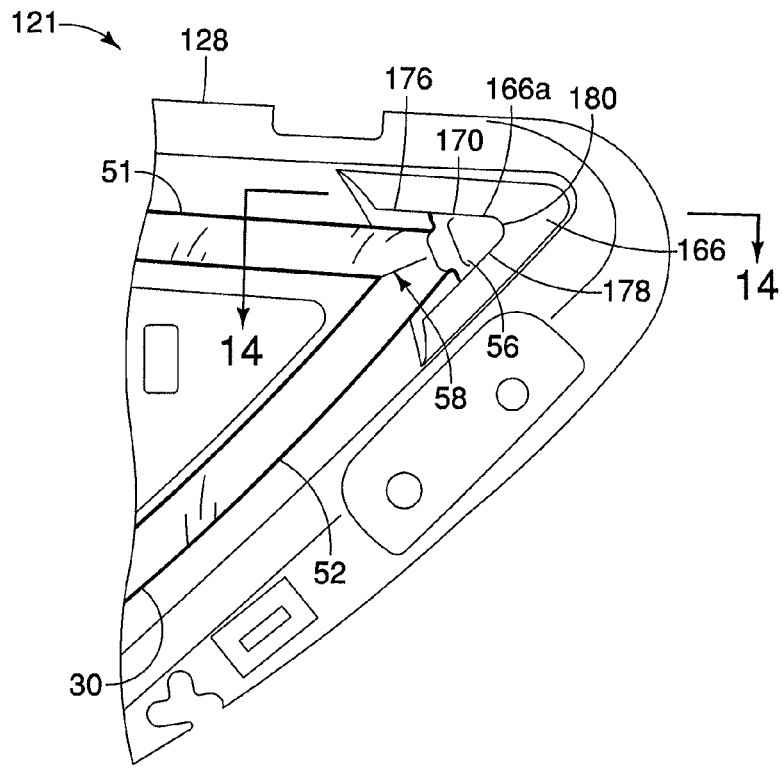
FIG. 13 is a partial exterior facing elevational view of selected parts of a driver side vehicle lamp unit in accordance with a first modification of the bezel member, showing a corner area of the vehicle lamp unit.
Figure 14:
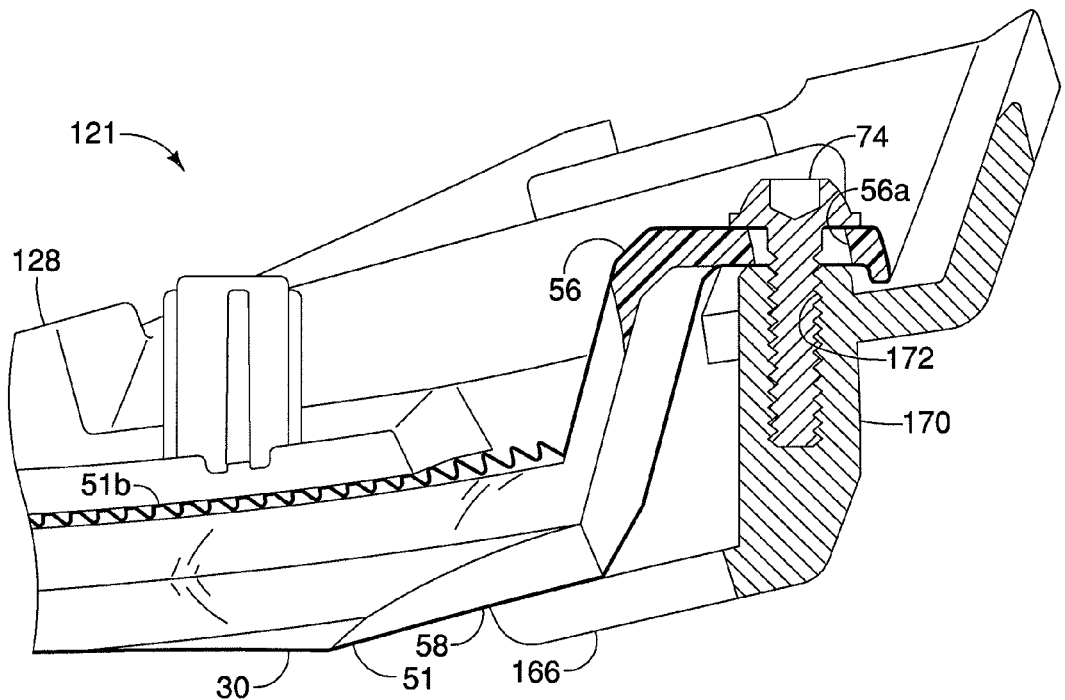
FIG. 14 is a partial cross sectional view of a portion of the vehicle lamp unit illustrated in FIG. 13, taken along a section line 14-14 in FIG. 13.

Referring now to FIGS. 13 and 14, a first modified vehicle lamp unit 121 will now be discussed. Basically, the vehicle lamp unit 121 is identical to the vehicle lamp unit 21, except that the bezel member 28 has been replaced with a modified bezel member 128 having a modified cover trim portion 166. In view of the similarity between the vehicle lamp units 21 and 121, the vehicle lamp unit 121 will only be briefly discussed for the sake of brevity. Moreover, the parts of the vehicle lamp unit 121 which are identical or in function to the corresponding parts of the vehicle lamp unit 21 will be given the same reference numbers.

As seen in FIG. 13, in the first modified vehicle lamp unit 121, the cover trim portion 166 is disposed adjacent the corner area 58 of the light pipe structure 30. That is, instead of extending over the corner area 58 as in the vehicle lamp unit 21, the cover trim portion 166 has a shaped cut-out 166a that generally outlines the corner area 58 of the light pipe structure 30. Specifically, the cover trim portion 166 has a peripheral edge 170 having a first edge portion 176 and a second edge portion 178 that define the cutout 166a. The first and second edge portions 176 and 178 intersect to define an inside corner 180 of the cover trim portion 166. In the illustrated embodiment, the first edge portion 176 and the second edge portion 178 are spaced apart from the peripheral edges of the corner area 58 of the light pipe structure 30 so that the second mounting part 56 is partially exposed. As previously stated, the second mounting part 56 and the light pipe structure 30 are a one-piece single unit of material that can transmit and diffuse light. As a result, the vehicle lamp unit 121 is also illuminated at the portion of the second mounting part 56 that is exposed by the cut-out of the cover trim portion 66. In other words, the cut-out 166a of the cover trim portion 166 defines a corner area outline of the light being emitted from the light pipe structure 30 at the intersection between the first and second light pipe portions 51 and 52. In this way, when the vehicle lamp unit 121 is illuminated, there is a continuous lit appearance at the corner area outline of the light being emitted from the light pipe structure 30.

Similar to the cover trim portion 66, the cover trim portion 166 includes a mounting boss 170 that has a second opening 172. As shown in FIG. 14, the fastener 74 is disposed through the first opening 56a of the second mounting part 56 of the light pipe structure 30 as well as the second opening 172 of the mounting boss 170 to secure the light pipe structure 30 to the bezel member 128. As in the vehicle lamp unit 21, the fastener 74 is fastened to the light pipe structure 30 and the bezel member 128 behind a hidden surface of the bezel member 128. Thus, the fastener 74 is not visible when the vehicle lamp unit 121 is assembled. This provides for a continuous illumination appearance for the vehicle lamp unit 121 at the corner area outline of the light pipe structure 30 that is uninterrupted by the fastener 74.

Figure 15:
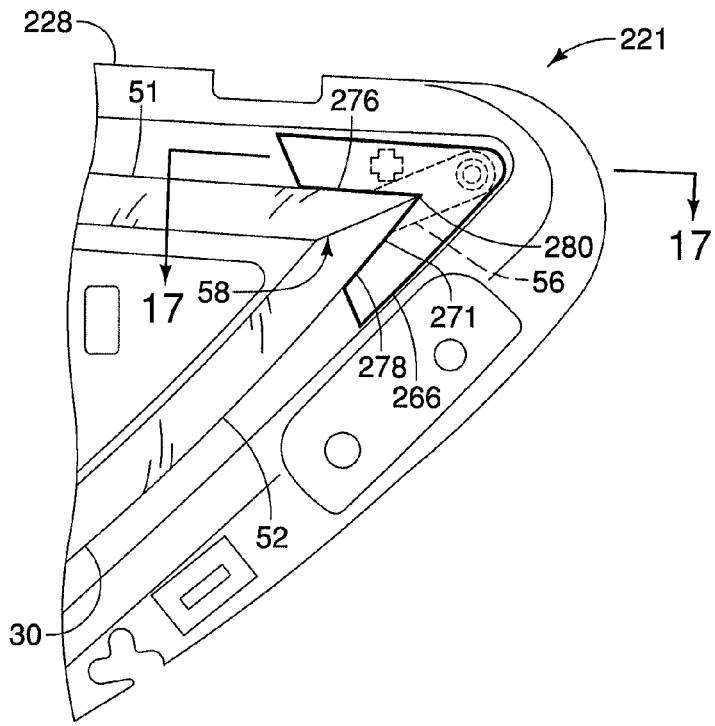
FIG. 15 is a partial exterior facing elevational view of selected parts of a vehicle lamp unit in accordance with a second modification, showing a corner area of the vehicle lamp unit.
Figure 16:
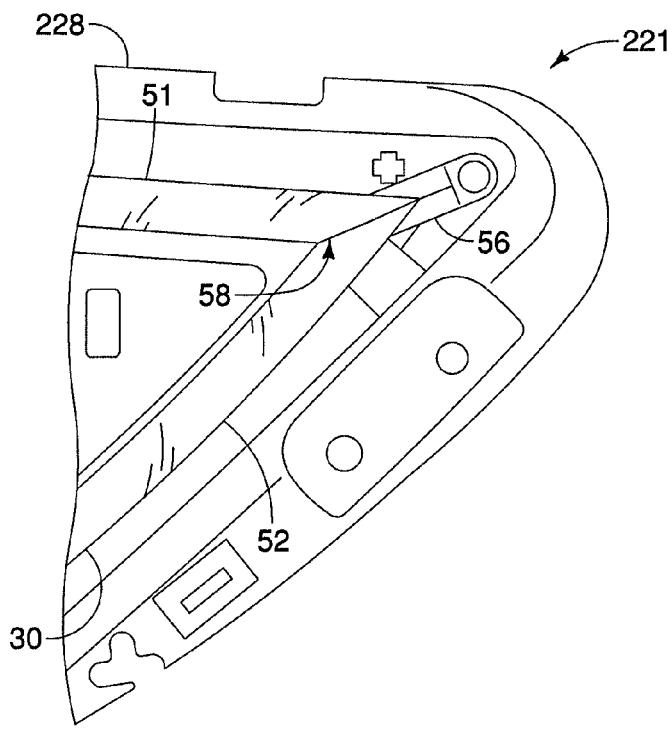
FIG. 16 is a partial exterior facing elevational view of the vehicle lamp unit illustrated in FIG. 15 with a cover trim portion of the bezel member removed to show the attachment of the light pipe structure to the bezel member.
Figure 17:
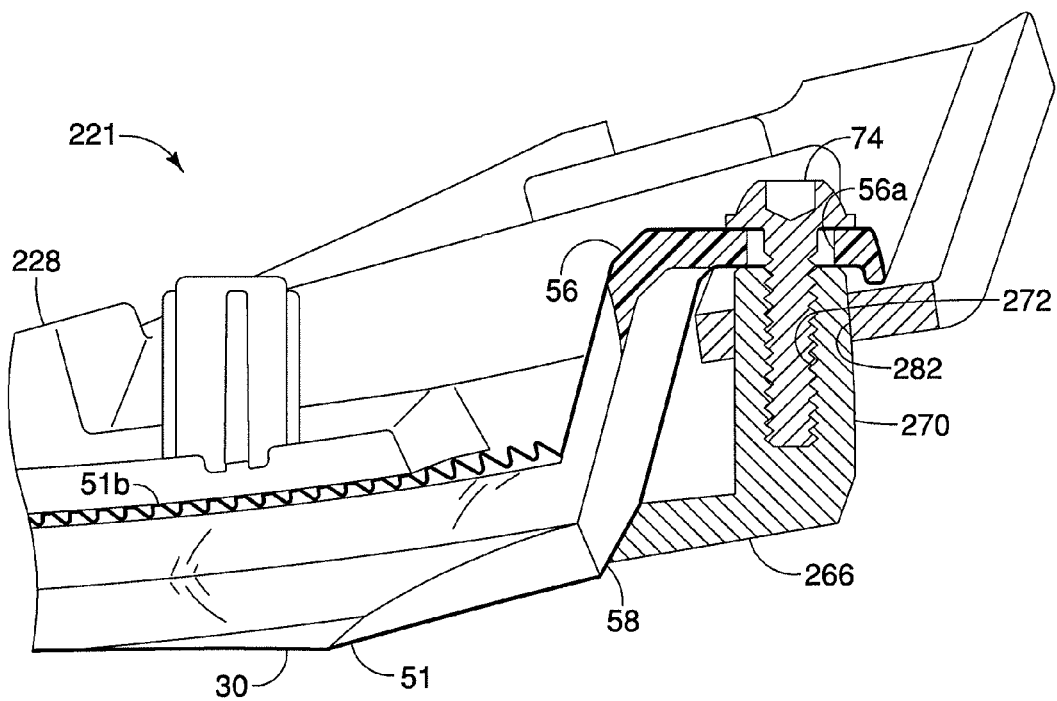
FIG. 17 is a partial cross sectional view of the portion of the vehicle lamp unit illustrated in FIG. 15, taken along lines 17-17 in FIG. 15.

Referring now to FIGS. 15 to 17, a second modified vehicle lamp unit 221 will now be discussed. Basically, the vehicle lamp unit 221 is identical to the vehicle lamp units 21 and 121, except that the bezel member 28 and 128 has been replaced with a second modified bezel member 228 having a second modified cover trim portion 266. In the vehicle lamp unit 221, the cover trim portion 266 is detachably coupled to the bezel member 228 by the fastener 74. The cover trim portion 266 has a mounting boss 270 disposed through a third opening 282 of the bezel member 228 to couple the cover trim portion 266 to the bezel member 228. In the illustrated embodiment, the cover trim portion 266 is detachably coupled on the bezel member 228 to cover the second mounting part 56 of the light pipe structure 30 from view.

The cover trim portion 266 has a peripheral edge 271 having a first edge portion 276 and a second edge portion 278 meeting to define a corner 280. In the vehicle lamp unit 221, the first and second edge portions 276 and 278 are not spaced apart from the peripheral edges of the first and second light pipe portions 51 and 52. Instead, the first and second edge portions 276 and 278 trace the peripheral edges of the first and second light pipe portions 51 and 52. Thus, the first and second edge portions 276 and 278 define an corner area outline of the light being emitted from the light pipe structure 30 at the intersection between the first and second light pipe portions 51 and 52. In this way, when the vehicle lamp unit 221 is illuminated, the light emitted at the corner area outline of the light pipe structure 30 forms a sharp illuminated corner that is continuously lit.

As seem in FIG. 17, when the vehicle lamp unit 221 is fully assembled, the fastener 74 is disposed through the first opening 56a of the light pipe structure 30, the second opening 272 of the bezel member 228, and the third opening 282 of the bezel member 228. In the vehicle 221, the cover trim portion 266 has the second opening 272. Thus, the fastener 74 fastens the light pipe structure 30 to the cover trim portion 266. As the fastener 74 is hidden from view behind the cover trim portion 266, the vehicle lamp unit 221 has a continuous illuminated appearance at the corner area outline of the light being emitted from the light pipe structure.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the vehicle lamp unit. Accordingly, these terms, as utilized to describe the present invention should be interpreted relative to a vehicle equipped with the vehicle lamp unit.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature. Thus, the foregoing descriptions of the embodiments according to the present invention are provided for illustration only, and not for the purpose of limiting the invention as defined by the appended claims and their equivalents.

What is claimed is:

1. A vehicle lamp unit comprising:
a lamp housing configured to be mounted to a vehicle;
a bezel member having a front side facing away from the lamp housing, a back side facing the lamp housing, and a cover trim portion extending from the front side;
a light pipe structure having at least one pipe portion disposed on the front side of the bezel member and a mounting flange disposed underneath the cover trim portion; and
a fastener extending through a first opening of the mounting flange of the light pipe structure and a second opening of the bezel member.

2. The vehicle lamp unit according to claim 1, further comprising
a circuit board having at least one light source emitting light to be received by the light pipe structure, the light pipe structure having a mounting part connected to the circuit board.

3. The vehicle lamp unit according to claim 2, wherein the at least one pipe portion has a first pipe portion with an end that receives light from a first light source of the circuit board and a second pipe portion with an end that receives light from a second light source of the circuit board.

4. The vehicle lamp unit according to claim 3, wherein the first and second pipe portions include faceted surfaces that disperse light received from the first and second light sources, respectively.

5. The vehicle lamp unit according to claim 1, wherein the cover trim portion of the bezel member includes a mounting boss, the mounting boss having the second opening that receives the fastener.

6. The vehicle lamp unit according to claim 3, wherein the cover trim portion overlies a corner area defined by an intersection of the first and second pipe portions.

7. The vehicle lamp unit according to claim 3, wherein the cover trim portion includes a peripheral edge having a first edge portion and a second edge portion, the first and second edge portions meeting to define a corner that is disposed adjacent a corner area defined by an intersection of the first and second light pipe portions.

8. The vehicle lamp unit according to claim 3, wherein the cover trim portion is disposed adjacent a corner area of the light pipe structure, the corner area is defined by an intersection of the first and second pipe portions, and the cover trim portion has a peripheral edge that defines a corner area outline of the light being emitted from the light pipe structure at the intersection between the first and second light pipe portions.

9. The vehicle lamp unit according to claim 8, wherein the cover trim member is detachably coupled to the bezel member by the fastener.

10. A vehicle lamp unit comprising:
a lamp housing configured to be mounted to a vehicle;
a bezel member having a having a front side facing away from the lamp housing, a back side facing the lamp housing, and a cover trim portion extending from the front side;
a light pipe structure having a first pipe portion, a second pipe portion and a mounting flange located at a corner area defined by the intersection of the first and second pipe portions, the bezel member being attached to the first pipe portion at a first end of the light pipe structure and attached to the second pipe portion at a second end of the light pipe structure, the light pipe structure having a mounting flange fixedly securing the light pipe structure to the bezel member at the corner area; and
a fastener disposed through a first opening of the mounting flange of the light pipe structure and a second opening of the bezel member.

11. The vehicle lamp unit according to claim 10, further comprising
a circuit board having at least one light source emitting light to be received by the light pipe structure, the light pipe structure having a mounting part connected to the circuit board.

12. The vehicle lamp unit according to claim 11, wherein the first end of the light pipe structure receives light from a first light source of the circuit board and the second end of the light pipe structure receives light from a second light source of the circuit board.

13. The vehicle lamp unit according to claim 12, wherein the first and second pipe portions include faceted surfaces that disperse light received from the first and second light sources, respectively.

14. The vehicle lamp unit according to claim 10, wherein the cover trim portion of the bezel member includes a mounting boss, the mounting boss having the second opening that receives the fastener.

15. The vehicle lamp unit according to claim 10, wherein the cover trim portion overlies the corner area of the light pipe structure.

16. The vehicle lamp unit according to claim 10, wherein the cover trim portion includes a peripheral edge having a first edge portion and a second edge portion, the first and second edge portions meeting to define a corner that is disposed adjacent the corner area.

17. The vehicle lamp unit according to claim 10, wherein the cover trim portion is disposed adjacent the corner area of the light pipe structure and has a peripheral edge that defines a corner area outline of the light being emitted from the light pipe structure at the intersection between the first and second light pipe portions.

18. The vehicle lamp unit according to claim 17, wherein the cover trim member is detachably coupled to the bezel member.

19. A vehicle body structure including the vehicle lamp unit of claim 1, further comprising
a vehicle body having at least one body panel that defines an access opening, and
a movable vehicle body panel movably mounted on the vehicle body, the vehicle lamp unit being mounted on the movable vehicle body panel.

20. The vehicle body structure of claim 19, wherein the at least one body panel includes a mating vehicle lamp unit mounted thereon,
the mating vehicle lamp unit having a peripheral edge that aligns with a peripheral edge of the vehicle lamp unit.

* * * * *